Aug. 28, 1923.  
H. B. GILLETTE  
1,466,434  
WHEEL STRUCTURE FOR DRY KILN TRUCKS  
Filed Sept. 23, 1921  
3 Sheets-Sheet 1
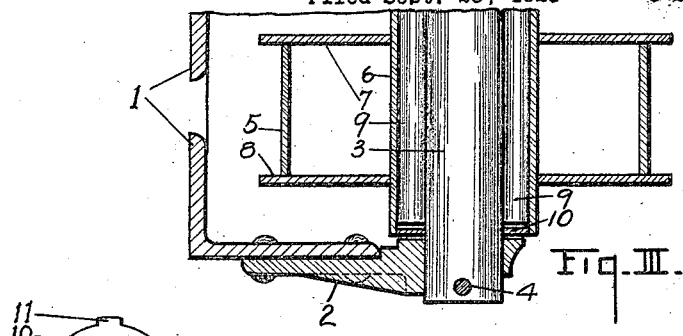
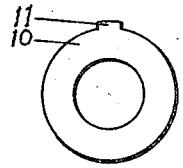
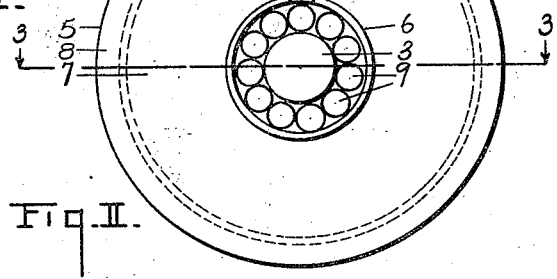
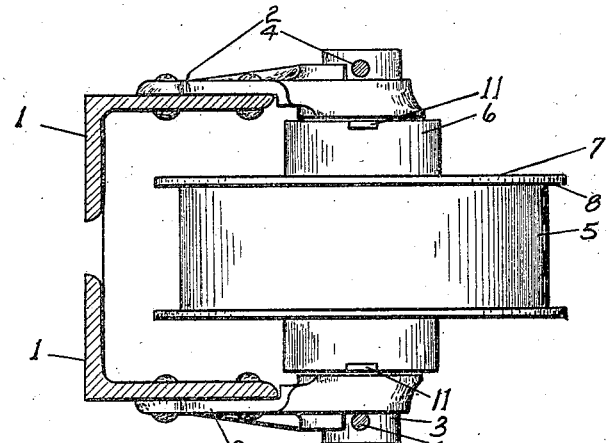
INVENTOR  
*Herbert B. Gillette*  
BY *Chappell Earl*  
ATTORNEY Aug. 28, 1923.
H. B. GILLETTE
WHEEL STRUCTURE FOR DRY KILN TRUCK
Filed Sept. 23, 1921   3 Sheets-Sheet 2
1,466,434
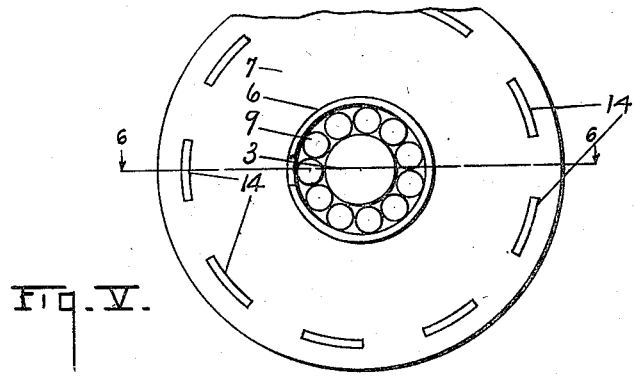
Fig. V.
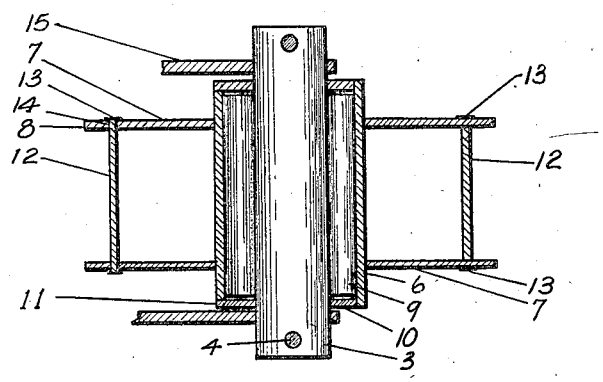
Fig. VI.
INVENTOR
Herbert B. Gillette
BY
ATTORNEYS Aug. 28, 1923.
H. B. GILLETTE
1,466,434
WHEEL STRUCTURE FOR DRY KILN TRUCKS
Filed Sept. 23, 1921   3 Sheets-Sheet 3
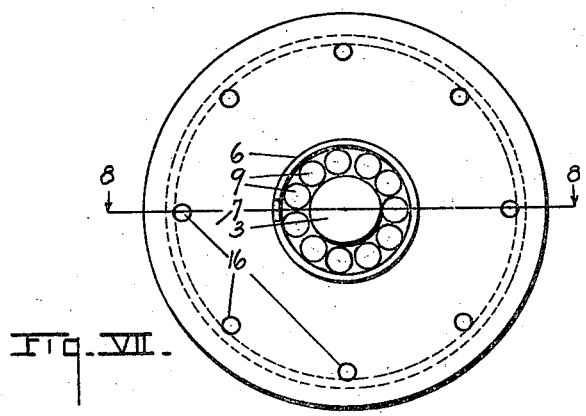
Fig. VII.
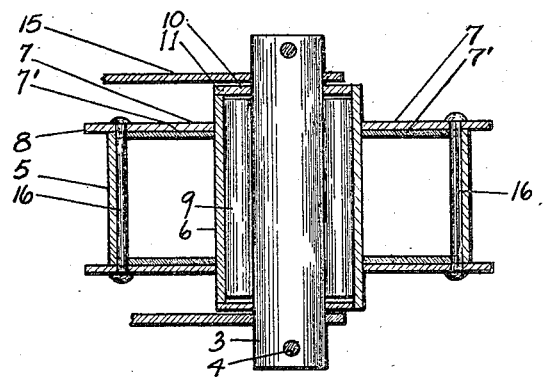
Fig. VIII.
INVENTOR.
Herbert B. Gillette
BY
ATTORNEYS.

Patented Aug. 28, 1923.

1,466,434

UNITED STATES PATENT OFFICE.

HERBERT B. GILLETTE, OF GRAND RAPIDS, MICHIGAN.

WHEEL STRUCTURE FOR DRY-KILN TRUCKS.

Application filed September 23, 1921. Serial No. 502,774.

*To all whom it may concern:*

Be it known that I, HERBERT B. GILLETTE, a citizen of the United States, residing at Grand Rapids, county of Kent, State of Michigan, have invented certain new and useful Improvements in Wheel Structures for Dry-Kiln Trucks, of which the following is a specification.

This invention relates to improvements in wheel structures for dry kiln trucks.

The object of the invention is to provide an improved wheel structure which shall be very light and strong for use in roller bearing dry kiln trucks, particularly like that illustrated in United States Letters Patent to Herbert B. Gillette, No. 734,057, though it is capable of a more extended use.

Objects pertaining to details and economies of construction and operation will definitely appear from the detailed description to follow.

I accomplish the objects of my invention by the devices and means described in the following specification. The invention is clearly defined and pointed out in the claims.

Structures exemplifying several embodiments of my invention are clearly illustrated in the accompanying drawing, forming a part of this specification, in which:

Fig. I is an elevation end view of a cross section of truck showing one of my improved wheel structures in full lines.

Fig. II is a side elevation of the wheel there illustrated, removed from the truck, with the roller retaining washer removed.

Fig. III is a vertical detail transverse sectional elevation view through the structure, taken on line 3—3 of Fig. II.

Fig. IV is a detail elevation view of the roller retaining washer.

Fig. V is a detail elevation view of a modification of the wheel structure.

Fig. VI is a sectional view of the structure shown in Fig. V, taken on line 6—6 of Fig. V, showing a cross section of wheel in a truck having sheet metal side walls.

Fig. VII is an elevation view of a further modification of wheel structure.

Fig. VIII is a sectional view similar to the sectional view of Fig. VI, taken on line 8—8 of Fig. VII.

In the drawings the sectional views are taken looking in the direction of the little arrows at the ends of the section lines and similar numerals of reference refer to similar parts throughout the several views.

Considering the numbered parts of the drawing, 1, 1 are the angle side bars of a truck. 2, 2 are the brackets carrying the axles 3, retained in position by means of the cross pins 4, 4 at each end. These portions are in the same form as that appearing in the said Patent No. 734,057 above referred to.

The wheel 5 is provided with a tubular sheet metal hub 6 on which are supported disk-like sides 7 of the wheel extended into flanges 8 beyond the body of the wheel 5, as clearly appears in Fig. III, the body of the wheel being suitably spot welded or otherwise secured to the said disk-like sides 7. Disposed between the axle 3 and the hub 4 are bearing rollers 9. End washers 10 are inserted on the ends of the hub and are retained against rotation by projecting lugs 11 disposed in suitable notches in the said hub.

While I have described my improved wheel structure as especially adapted to the structure of said Patent No. 734,057, it may be made use of in the structure having channel iron sides like that appearing Patent No. 1,383,462, issued July 5, 1921, to Herbert B. Gillette. I have shown my improved wheel structure in its simplest form. The sheet metal parts may be variously formed and variously secured together. I prefer, however, the electric welding of parts as the most effective and secure.

In Figs. V and VI, I show the body of the wheel 12 with projecting lugs 13 extending through perforations 14 in the disk sides 7, the same being suitably riveted down. The wheel is here illustrated in conjunction with a truck having a sheet metal frame 15.

A further modification appears in Figs. VII and VIII. Here the body of the wheel 5 rests upon auxiliary supporting disks 7' within the disk sides of the wheel 7 and a series of rivets 16 are disposed through the sides just within the periphery of the body 5 and clamp the parts securely together. This makes a very strong construction.

Having thus described my invention what I claim as new and desire to secure by Letters Patent is:

1. The combination in a dry kiln truck wheel structure, of retaining bearing brackets with thrust bearings on the surfaces therebetween, a suitable axle disposed between the said bracket means and secured thereto, a carrying wheel having a sheet metal hub and a sheet metal cylindrical body provided with disk-like sides welded together, bearing rollers superposed between the axle and the inner wall of said hub, and retaining washers at each end of said hub with extended lugs disposed in notches in the said hub and coacting with the said thrust bearing surfaces of the brackets, as specified.

2. The combination in a dry kiln truck wheel structure of a suitable axle, a carrying wheel having a sheet metal hub and a sheet metal cylindrical body portion with disk-like sides, bearing rollers interposed between the axle and the inner wall of said hub, and retaining washers at each end of said hub and between bearing surfaces with extending lugs disposed in notches therein, as specified.

3. The combination in a dry kiln truck wheel structure of a carrying wheel having a sheet metal hub and a sheet metal cylindrical body portion with disk-like sides welded together, bearing rollers interposed between the axle and the inner wall of said hub, and retaining members with lugs disposed in notches therein with thrust bearing surfaces outside, as specified.

In witness whereof, I have hereunto set my hand and seal.

HERBERT B. GILLETTE. [L. S.]